United States Patent
Engström et al.

(10) Patent No.: US 6,672,598 B1
(45) Date of Patent: Jan. 6, 2004

(54) MEMBER ARRANGED TO ACT BETWEEN TWO IN RELATION TO EACH OTHER MOVABLE PARTS OF A VEHICLE

(75) Inventors: Jörgen Engström, Huddinge (SE); Peter Kjellqvist, Mölnbo (SE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/889,896
(22) PCT Filed: Jan. 27, 2000
(86) PCT No.: PCT/SE00/00166
  § 371 (c)(1),
  (2), (4) Date: Sep. 18, 2001
(87) PCT Pub. No.: WO00/44602
  PCT Pub. Date: Aug. 3, 2000

(30) Foreign Application Priority Data
  Jan. 27, 1999 (SE) .................................... 9900249
(51) Int. Cl.⁷ .............................................. B62D 37/00
(52) U.S. Cl. ...................... 280/6.15; 74/63; 74/89.34
(58) Field of Search ........................... 280/6.15; 74/63, 74/89.34, 89.23

(56) References Cited

U.S. PATENT DOCUMENTS

| | | | |
|---|---|---|---|
| 3,161,074 A | | 12/1964 | Korthaus et al. |
| 4,557,153 A | | 12/1985 | Ulbing |
| 4,603,594 A | * | 8/1986 | Grimm ...................... 74/89.39 |
| 4,987,788 A | | 1/1991 | Bausch |
| 5,083,626 A | * | 1/1992 | Abe et al. .................... 180/445 |
| 5,595,089 A | * | 1/1997 | Watanabe et al. .......... 74/89.34 |
| 5,775,469 A | * | 7/1998 | Kang ......................... 188/267 |
| 5,946,981 A | * | 9/1999 | Ide et al. ................... 74/579 R |
| 6,158,295 A | * | 12/2000 | Nielsen ...................... 74/89.38 |
| 6,405,836 B1 | * | 6/2002 | Rieth et al. ................ 188/72.1 |
| 6,439,338 B2 | * | 8/2002 | Yoshioka et al. ........... 180/444 |
| 6,454,044 B1 | * | 9/2002 | Menjak et al. .............. 180/444 |
| 6,464,034 B1 | * | 10/2002 | Toda et al. ................. 180/444 |

FOREIGN PATENT DOCUMENTS

| | | |
|---|---|---|
| DE | 855785 | 11/1952 |
| DE | 29621247 | 1/1997 |
| EP | 0673827 | 9/1995 |
| SE | 451624 | 10/1987 |

\* cited by examiner

Primary Examiner—Paul N. Dickson
Assistant Examiner—Toan To
(74) Attorney, Agent, or Firm—Swidler Berlin Shereff Friedman, LLP

(57) ABSTRACT

The present invention relates to a member (1) arranged to act between two parts of a vehicle which are movable in relation to each other. The member (1) comprises a first portion (2) having an elongated rod (6) with external threads (7) and a second portion (3) having a nut (8) rotatably provided on the rod (6) so that the length of the member (1) during a rotary motion between the rod (6) and nut (8) is variable in an axial direction (L). An electric rotor machine (10), having a stator (11) and a rotor (13) which is rigidly connected to said nut (8), is arranged to influence said rotary motion. The rotor (13) and nut (18) are so positioned in relation to each other that at least a radial plane with respect to the axial direction (L) extends both through the rotor (13) and the nut (8).

11 Claims, 3 Drawing Sheets

MEMBER ARRANGED TO ACT BETWEEN TWO IN RELATION TO EACH OTHER MOVABLE PARTS OF A VEHICLE

TECHNICAL FIELD OF THE INVENTION AND PRIOR ART

The present invention relates to a member arranged to act between two parts of a vehicle which are movable in relation to each other, wherein the member extends between said parts and comprises a first portion connectable to the first part of the vehicle and a second portion connectable to the second part of the vehicle, wherein the first portion comprises an elongated rod having external threads and the second portion a nut provided rotatably on the rod so that the length of the member, during a rotary motion between the rod and the nut, is variable in an axial direction, wherein an electric rotor machine having a stator and a rotor is arranged to influence said rotary motion and wherein the rotor and the nut are so located in relation to each other that at least one radial plane with respect to the axial direction extends both through the rotor and the nut.

In order to obtain a good comfort for passengers in a trackbound vehicle, it is usually equipped with members arranged to damp the motions of a car body in relation to an underlying bogie frame. In modern trackbound vehicles, members are also used which are arranged to displace the car body laterally in relation to the underlying bogie frame during travel in curves and also to tilt the car body for the purpose of further increasing the travel comfort for the passengers. Usually, such members are hydraulic or pneumatic. A disadvantage with the hydraulic or pneumatic members is that they are subject to faults and that they require a great deal of maintenance.

From DE 296 21 247 01 it is known to arrange an electrically driven member in a trackbound vehicle in order to control the tilting of the car body during travel in curves. The member is attachable between the car body and an underlying bogie frame and comprises two in relation to each other in the longitudinal direction displaceable portions. The first portion comprises a nut and the second portion an elongated threaded rod, which during rotation co-operates with the nut so that the length of the member may be changed. The second portion comprises for the rotation of the rod, an electric rotor machine having a stator and a rotor rigidly connected to the rod. The alternative possibility that the electric rotor machine may drive the nut instead of the rod is also indicated in the document.

In order for an electric rotor machine to be able to displace a car body in relation to a bogie frame without deteriorating the dynamic properties of the trackbound vehicle, the parts rotating with the rotor may not have a too large momentum of inertia. Therefore, the mass of said rotating parts ought to be as small as possible. A disadvantage with the known construction is that the motions of the rotor are transferred to the rod, which has a relatively large mass. Furthermore, the transmission between the rotor and the rod occurs at a first position whereafter the rotary motion of the rod is transferred to the nut at a second position located at a distance from the first position. Such a transmission comprises a considerable amount of losses. Therefore, the known electric member described above will presumably not function well in order to displace a car body.

SUMMARY OF THE INVENTION

The object of the present invention is to provide an electric driven member of the initially mentioned kind which has a relatively small and compact construction and which may act between vehicle parts of a considerable weight in a reliable way. Thereby, such an electric member may replace conventional hydraulic and pneumatic members.

This object is achieved by said member initially mentioned, which is characterised in that the rotor and nut are rigidly connected and constitute an integrated part. Thereby, no separate coupling device between the rotor and the nut needs to be provided and the losses of this power transmission are thereby nearly non-existent. Furthermore, a very short power transmission path is obtained for the transmission of the rotary motion of the rotor, via the nut, to the rod and vice versa. An electric member according the above may therefore be manufactured as a compact construction with few parts. Therefore, the member may also because of its simplicity be manufactured with a low cost. Furthermore, such a member is substantially cheaper in operation than conventional hydraulic and pneumatic members since it requires less maintenance.

According to a preferred embodiment of the invention, the nut comprises internally carried balls arranged to run along the external threads of the rod during the rotary motion of the nut. With such balls it is achieved that the friction between the nut and the rod during the rotary motion is very low at the same time as the balls allow a certain inclination of the rod in relation to the nut without any appreciable increase of the friction therebetween.

According to another preferred embodiment of the invention, the stator is rigidly connected to the second portion. Thereby, the second portion may have an inner cavity suited to receive the electric rotor machine whose stator, which usually has an external cylindrical-shape, is rigidly attached in said cavity in a suitable way.

According to another preferred embodiment of the invention, the electric rotor machine is arranged to displace said vehicle parts in relation to each other via the member, when needed. The member may thereby be coupled to a control unit, which, for example, senses the lateral acceleration of the vehicle and the mutual position of the vehicle parts, the direction of motion and the velocity. Depending on said sensed values, the control unit may initiate a displacement of said vehicle parts to a desired position by means of a suitable supply of energy to the electric rotor machine. The electric rotor machine may also be arranged to damp the motions between the vehicle parts via the member, when needed. Such a member may thereby replace conventional damper members of the hydraulic or the pneumatic type. Such members may therewith work as displacement members or damper members on, most preferably, both as displacement members and damper members.

According to another preferred embodiment of the invention, the electric rotor machine comprises a permanently magnetised synchronous motor. In this case, the rotor is permanently magnetised and will thereby rotate exactly with the rotation speed of the rotating magnetic field. The rotation speed of the rotor is decided by the current frequency in the stator windings and the number of poles. By such an electric rotor machine, it is easy to give the member a necessary control and thereby such properties that it becomes suitable as displacement member and damper member. Other types of electric rotor machines than a permanently magnetised synchronous motor are also possible to use in order to obtain said displacement and/or damping.

According to another preferred embodiment of the invention, the vehicle is a trackbound vehicle. In trackbound vehicles, the supply of electric energy is usually not a problem and it is usually an advantage to be able to replace hydraulic or pneumatic members by electric ones. This is due to the fact that the electric driven members with auxiliary equipment require substantially less maintenance than the hydraulic or pneumatic ones. Furthermore, they require less space and have a substantially lower weight. Advantageously, said first and second parts of the vehicle are a car body and a bogie frame. In trackbound vehicles such a member may mostly be intended to influence the motions of the car body, in order to improve the travel comfort for the passengers. The member may thereby be arranged to displace the car body laterally in relation to the bogie frame during travel of the trackbound vehicle in curves. Such a member may also be arranged to tilt the car body in relation to the bogie frame during travel in curves. Furthermore, such a member may be arranged to damp substantially all motions of the car body occurring during the travel of the trackbound vehicle. Such damping motions of the car body may be performed both vertically and horizontally.

BRIEF DESCRIPTION OF THE DRAWINGS

In the following, a preferred embodiment of the invention is described as an example with reference to the attached drawings, in which.

DETAILED DESCRIPTION OF A PREFERRED EMBODIMENT OF THE PRESENT INVENTION

Figure 1:
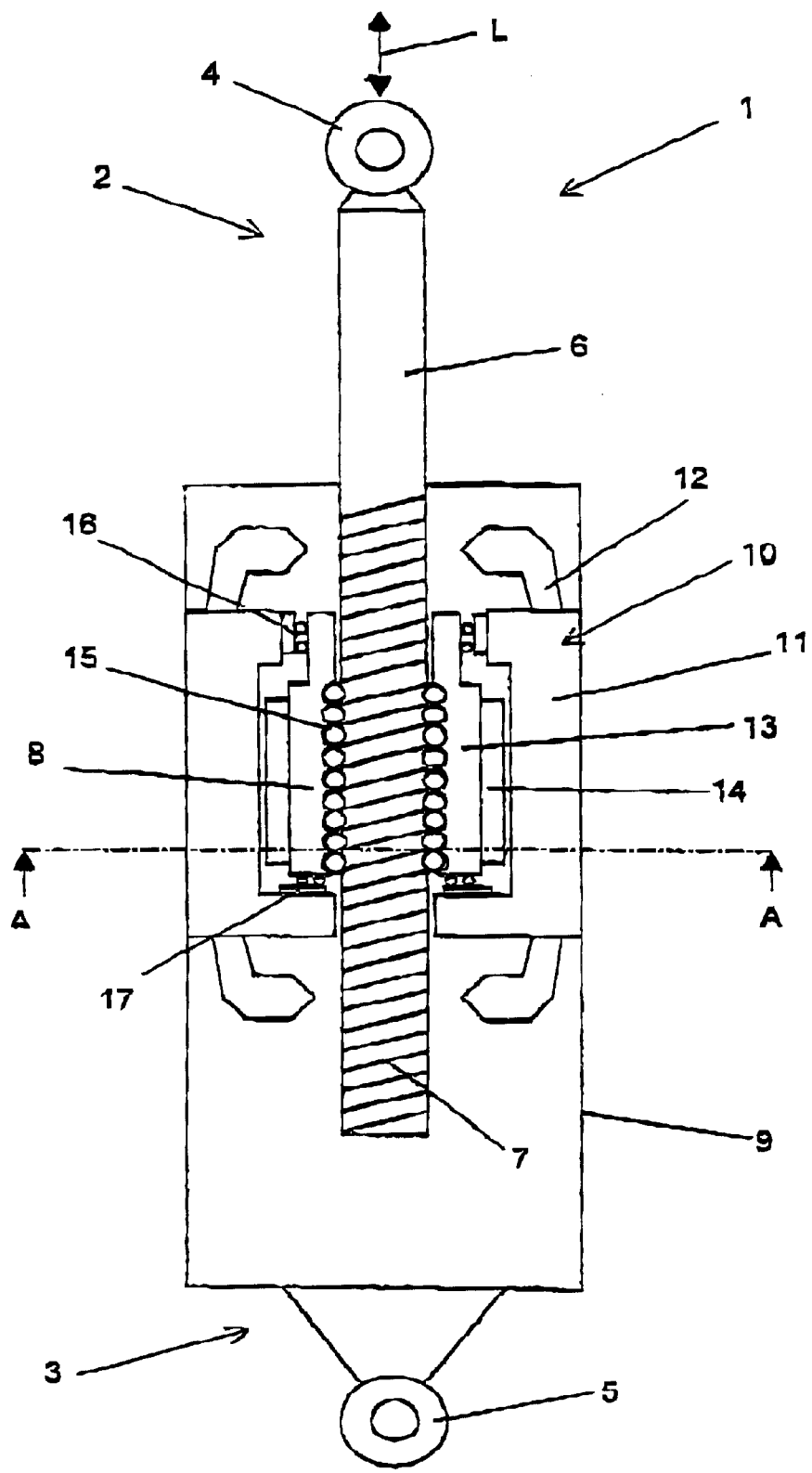
FIG. 1 shows a sectional view of a member according to the present invention.
Figure 2:
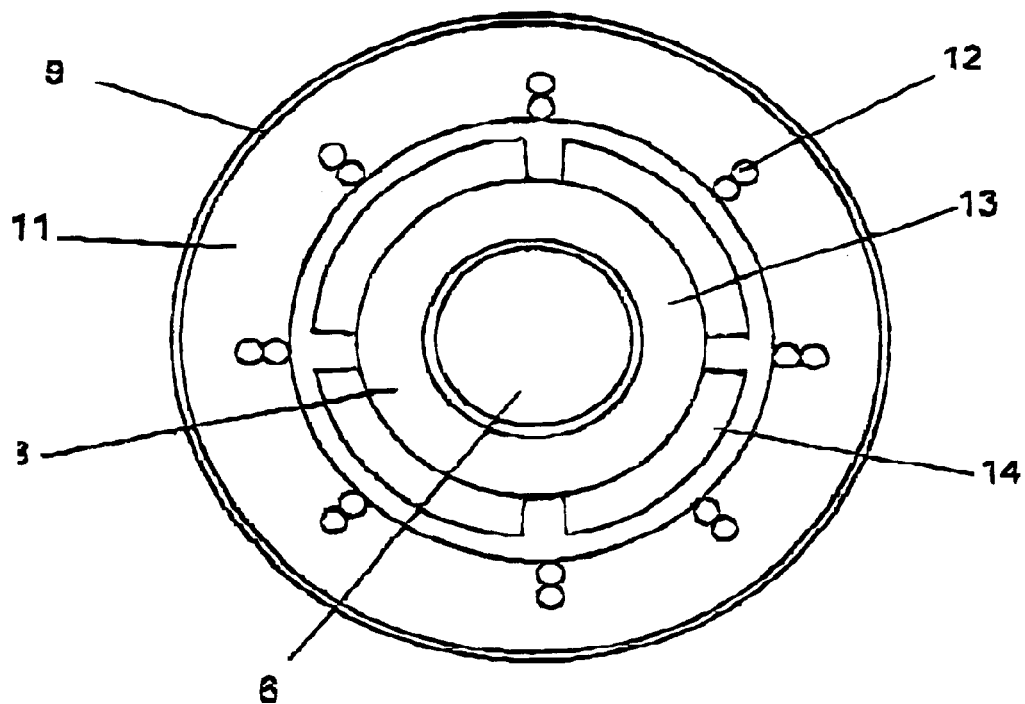
FIG. 2 shows a sectional view of the member in FIG. 1 along the line A—A.

FIGS. 1 and 2 show a member 1 arranged to act between two parts of a vehicle which are movable in relation to each other. The member 1 comprises a first portion 2 and a second portion 3, which are variable in length in relation to each other in order to influence the position of the vehicle parts which are movable in relation to each other. The first portion 2 is connectable to one of said vehicle parts by means of a first ring-shaped member 4 and the second portion 3 is connectable to the other vehicle part by means of a second ring-shaped member 5. The first portion 2 comprises an elongated rod 6 having external threads 7 while the second portion 3 comprises a nut 8 rotatably provided on the rod 6. Thereby, the length of the member 1 is variable in an axial direction L under a rotary motion between the rod 6 and nut 8. The second portion 3 comprises a cylindrical portion 9 having an inner cavity arranged to receive an electric rotor machine 10. The electric rotor machine 10 comprises a stator 11, which in a suitable way is rigidly attached in the cylindrical portion 9. The stator 11 comprises a plurality of through windings 12 arranged to conduct an electric current during activation of a rotor 13 provided radially internally in the stator 1. The rotor 13 is rigidly connected to the nut 8 so that they constitute an integrated part. FIG. 2 shows a sectional view along the line A—A in FIG. 1, this sectional view shows a radial plane, with respect to the axial direction L, where it is evident that the radial plane extends both through the rotor 13 and the nut 8. The rotor 13 shown in the figures surrounds the whole nut 8. The rotor 13 and the nut 8 have here a substantially common extension in the axial direction L. The rotor 13 comprises at an external surface four magnets 14, which are arranged to be permanently magnetised. The nut 8, which is integrated with the rotor 13, comprises internally carried balls 15 which are arranged to run along the external threads 7 of the rod 6 during rotation of the nut 8. With such balls 15 the friction between the nut 8 and the rod 6 may be kept at a very low level. The balls 15 admit also a smaller inclination of the rod 6 in relation to the nut 8 with no considerable increase of the friction. In order to obtain a substantially frictionless rotation of the rotor 13 in the stator 11, a first bearing 16 and a second bearing 17 are provided.

The electric rotor machine 10, shown in the FIGS. 1 and 2, is a synchronous machine having a permanently magnetised rotor 13. By feeding an alternating current through the windings 12 of the stator 11, is a rotating magnetic field formed, the rotation speed of which is determined by the frequency of the current and the number of poles. The rotor 13 of a synchronous machine rotates synchronously with the rotating magnetic field and the rotor 13 thereby obtains the same speed of rotation as the magnetic field. The rotation speed of the rotor 13 may thus be controlled by a variation of the frequency of the alternating current fed through the windings 12 of the stator 11. With such an electric rotor machine 10, it is easy to give the member 1 a necessary control and thereby such properties that is suitable both as displacement member and damper member.

Figure 3:
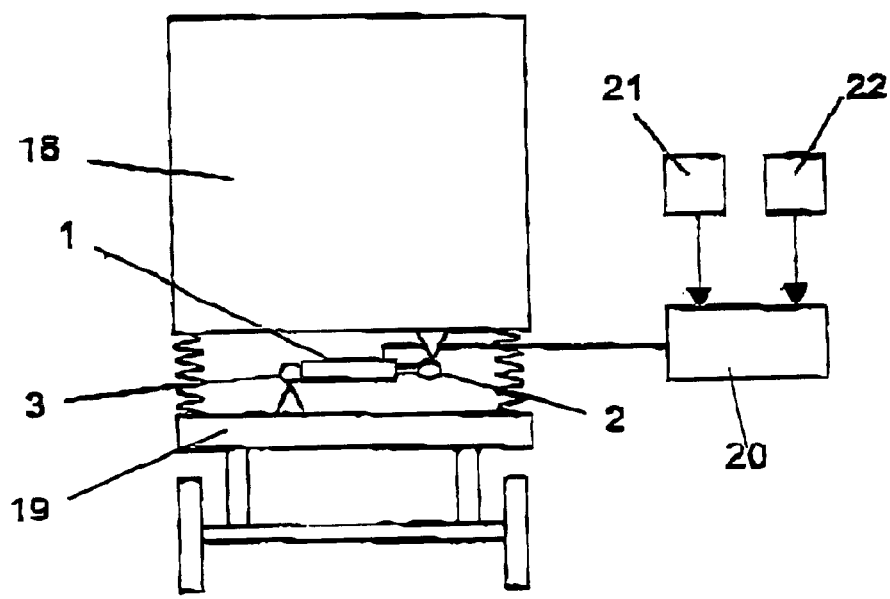
FIG. 3 shows a member according to the present invention provided to displace a car body of a trackbound vehicle laterally.

FIG. 3 shows a very advantageous application of the electric member 1 in a trackbound vehicle. In this case, the member 1 is arranged to displace the car body 18 laterally to a desired position during travel of the trackbound vehicle in curves. The member 1 comprises a first end 2 connected to the car body 18 and a second end 3 connected to a bogie frame 19. Since the member 1 is attached between two in relation to each other resilient parts 18, 19, the member 1 must be able to follow the relative motions between the car body 18 and the bogie 19 without adding stiffness to the spring suspension of the car body 18. A large rotating mass having a large moment of inertia adds such stiffness to the spring suspension at high frequencies. Therefore, the electric member 1, according to present invention, is very suited to be arranged for displacing a car body laterally as it has a very small rotating mass.

Figure 4:
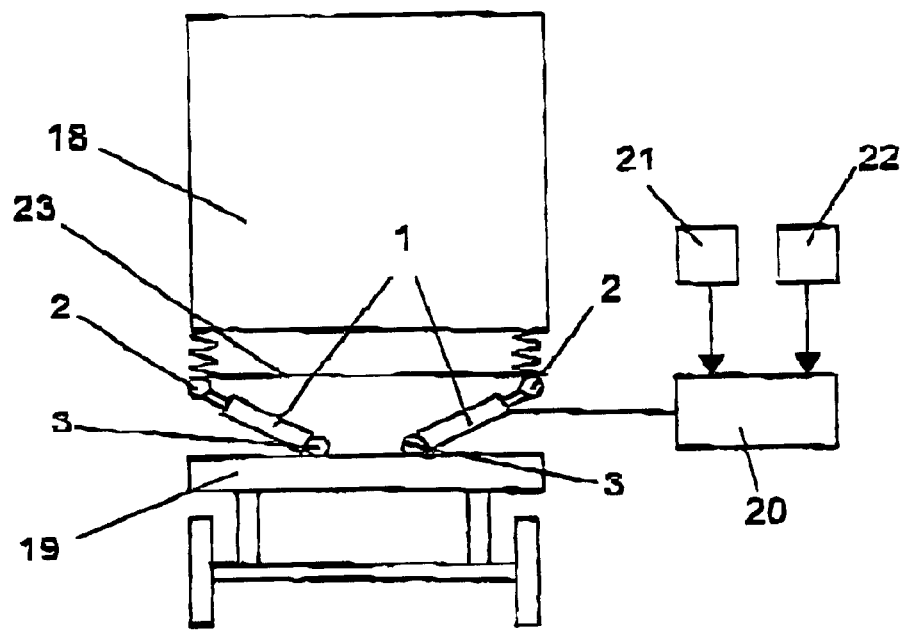
FIG. 4 shows two members according to the present invention provided to tilt a car body of a trackbound vehicle.

FIG. 4 shows another application of the electric member 1 in a trackbound vehicle. Two members 1, according to the above, are each with a first portion 2 connected to a car body 18 and with a second portion 3 connected to a bogie frame 19, via a so-called tilting bolster 23. The member 1 is in this application arranged to tilt the car body 18 in relation to a bogie frame 19 during travel of the trackbound vehicle in curves. By such a tilting bolster 23, which is resiliently arranged in relation to the car body 18, the motions of the members 1 do not influence the spring suspension of the car body to the same extent and requirements that the electric member shall have a small rotating mass are here not as high as before.

An electric control unit 20 may be arranged to control the electric members 1 shown in FIGS. 3 and 4. Such a control unit 20 may be arranged to sense the lateral acceleration acting on the car body by means of, for example, sensors 21. Therewith, the control unit 20 may calculate an optimised lateral displacement and tilting of the car body 18 in relation to the bogie frame 19, during travel in curves, at which the passengers in the car body 18 experience an optimum of travel comfort. Furthermore, the control unit 20 may sense other parameters necessary to displace the car body to the optimum position. Such parameters may be the position of the car body 18, the direction of motion and the velocity in relation to the bogie frame 19 and be sensed by sensors 22. In the light if this information, the control unit 20 may calculate necessary values of the current which must be conducted through the stator windings 12 of the respective members 1 in order to displace the car body 18 from the actual position to the calculated optimum position. Thereafter, the control unit 20 initiates the supply of current, according to calculated values of the current, to each of the stator windings 12 of the members 1. The respective member 1 is thereby changed in length so that the car body is displaced from the actual position to the calculated position in relation to the bogie frame 19. Preferably, the supply of current to the windings 12 of the stator 11 is controlled so that the displacement motion of the car body 18 occurs in a relatively gentle way. In the situations, when no lateral acceleration influences the car body 18, i.e. on straight stretches, the electric members 1 function substantially as damping members for the rotary motions of the car body 18, which may occur during travel of the vehicle.

The electric members 1, as described above, may with a somewhat simpler control unit 20 function only as damping member. The members 1 may hereby be used both as vertical dampers and horizontal dampers.

The present invention is not in any way restricted to the above-described embodiment but may be varied freely within the scope of the claims. It is, for example, possible to use other types of electric rotor machines than permanently magnetised synchronous machines. The applicability of the member 1 is also not restricted to be used in trackbound vehicles but it may be used in substantially all types of vehicles having two vehicle parts which are movable in relation to each other.

What is claimed is:

1. A member arranged to act between two parts of a vehicle which are movable in relation to each other, wherein the member extends between said parts and comprises a first portion connectable to the first part of the vehicle and a second portion connectable to the second part, wherein the first portion comprises an elongated rod having external threads and the second portion comprises a nut rotatably provided on the rod so that the length of the member during a rotary motion between the rod and the nut is variable in an axial direction, wherein an electric rotor machine having a stator and a rotor is arranged to influence said rotary motion and wherein the rotor and the nut are located in relation to each other such that at least one plane perpendicular with respect to the axial direction extends through both the rotor and the nut, wherein the rotor and the nut are rigidly connected and constitute an integrated part.

2. A member according to claim 1, wherein the nut comprises internally carried balls arranged to run along the external threads of the rod during the rotary motion of the nut.

3. A member according to claim 1, wherein the stator is rigidly connected to the second portion.

4. A member according to claim 1, wherein the electric rotor machine is arranged to displace said vehicle parts in relation to each other via the member.

5. A member according to claim 1, wherein the electric rotor machine is arranged to damp the motion between the vehicle parts via the member.

6. A member according to claim 1, wherein the electric rotor machine comprises a permanently magnetized synchronous motor.

7. A member according to claim 1, wherein the vehicle is a trackbound vehicle.

8. A member according to claim 7, wherein said first and second part of the vehicle are a car body and a bogie frame.

9. A member according to claim 8, wherein the member is arranged to displace the car body laterally in relation to the bogie frame.

10. A member according to claim 8, wherein the member is arranged to tilt the car body in relation to the bogie frame.

11. A member according to claim 8, wherein the member is arranged to damp occurring motions of the car body in relation to the bogie frame.

\* \* \* \* \*